April 5, 1932.  J. B. TRIPP, JR  1,852,907
BRAKE LINING STRETCHER
Filed Aug. 16, 1930   2 Sheets-Sheet 1
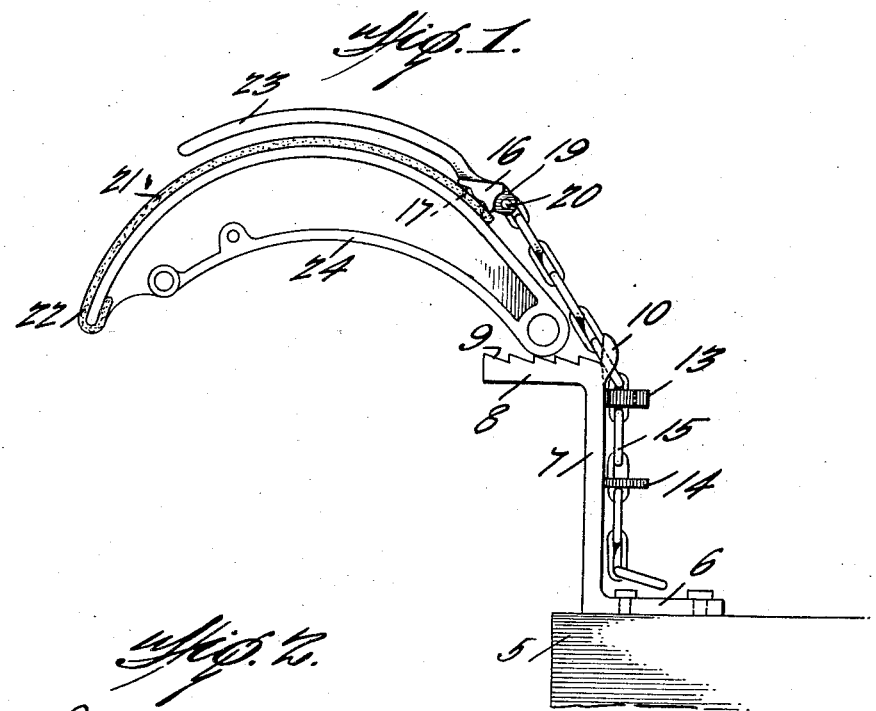
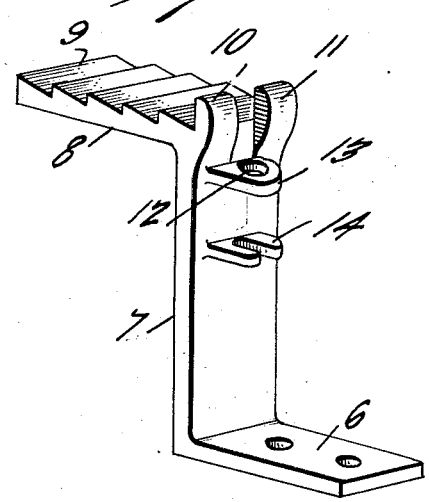
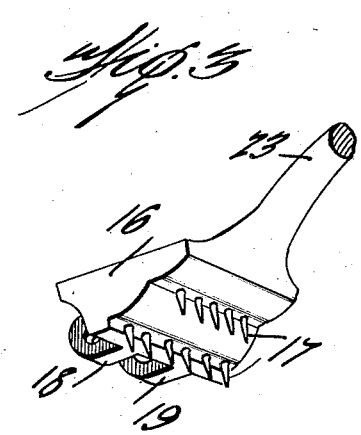
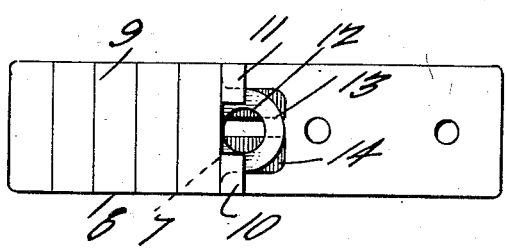

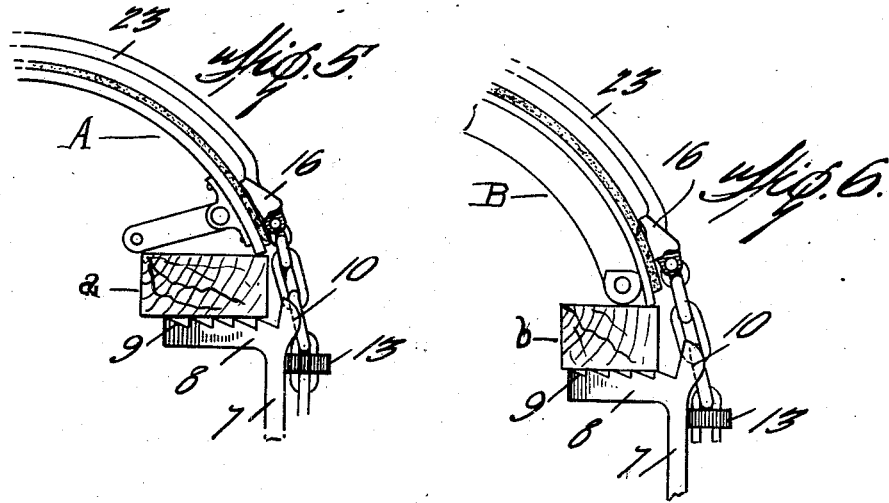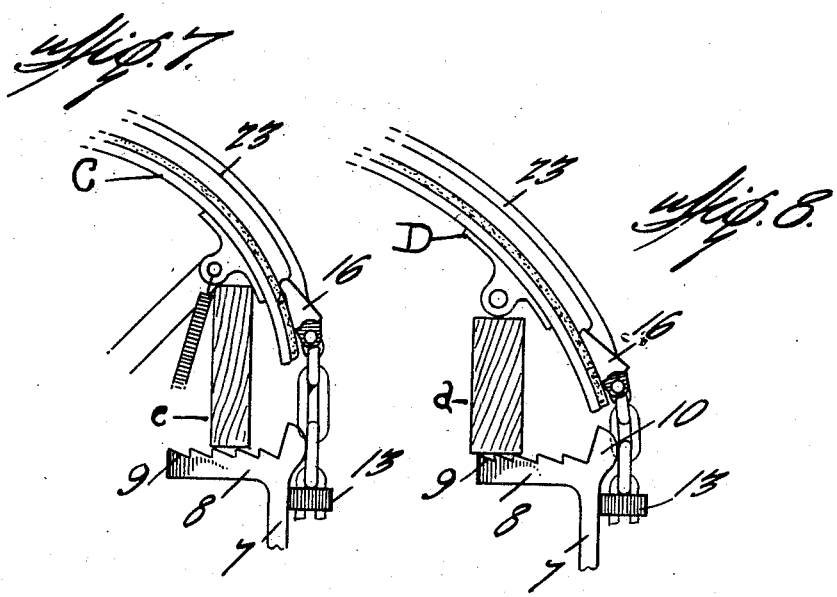

Patented Apr. 5, 1932

1,852,907

UNITED STATES PATENT OFFICE

JOHN B. TRIPP, JR., OF TRENTON, NEW JERSEY

BRAKE LINING STRETCHER

Application filed August 16, 1930. Serial No. 475,818.

This invention relates to a device for stretching brake linings in association with brake shoes, and has for an object the provision of a device adapted to be anchored to a brake lining and associated with means whereby manipulation of a brake shoe results in stretching the lining in order that said lining may be secured in proper condition on the said shoe.

It is a further object of this invention to provide a device of the character indicated with relation to which a brake shoe may be expeditiously applied and moved, and in which provision is made for adjustment in order that the best results may be attained.

It is a still further object of this invention to provide a member adapted to be engaged by a brake shoe and an anchorage for a device attached to a brake lining, which brake lining is attached to a brake shoe, whereby manipulation of the brake shoe will result in stretching the lining, as aforesaid.

It is furthermore an object of this invention to provide a device of the character indicated which is comparatively inexpensive to manufacture and maintain.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in elevation of a device embodying the invention, showing its use and function;

Figure 2 illustrates a perspective view of the bracket member of the invention;

Figure 3 illustrates a perspective view of a fragment of another part of the invention;

Figure 4 illustrates a plan view of the bracket shown in Figure 2; and

Figures 5, 6, 7 and 8 are views in elevation illustrating different means of utilizing the invention in association with braking elements of various types.

Any suitable bench or base 5 may be employed as a support for the angularly disposed base 6 of the standard 7 that terminates in a horizontally disposed head 8, whose upper surface is provided with serrations 9.

Guiding lugs 10 and 11 are formed integral with the standard and head and they are in spaced relation to each other to produce a clearance, as at 12. The standard is provided with an apertured ear or lug 13 and a bifurcated lug 14 therebelow, the aperture of the lug 13 being aligned with the space between the furcations of the lug 14.

The lugs 13 and 14 are intended to coact, in the present embodiment of the invention, with a chain 15 having links of a size which will pass through the aperture of the lug 13, and it is the intention of the inventor that the ends of the links when they are in coactive relation with the furcations of the lug 14 shall be engaged by said furcations and held while the device is being manipulated, as will presently appear, it being shown that the chain extends between the lugs 10 and 11.

A member 16 of any suitable construction, but sufficiently rugged to act as an effective anchor for spurs 17, is, in the present embodiment of the invention, provided with apertured ears 18 and 19, between which an end link of the chain 15 is anchored, through the medium of a pin 20, which pin is inserted in the apertures of the said ears. It is the intention of the inventor that the spurs shall be anchored in a brake lining, such as 21, at or near the end thereof remote from an end 22 of the brake lining which preliminarily is secured to the brake shoe in the ordinary way as by fastenings, such as rivets or the like. As mechanical means for anchoring linings to brake shoes are of varied types, no attempt is made to illustrate a particular type, as this feature will be understood by those skilled in the art.

Provision is preferably made for holding the member 16 from which the spurs project in operative relation to the brake lining and, to that end, the said member is shown as having a handle 23 which is curved in order that it will conform approximately to the curvature 24 of the surface of the brake shoe to which the lining is applied.

In carrying the invention into practice, the brake shoe is usually provided with a lining secured at one end, as stated, and the chain connected to the member 16 is threaded through the aperture of the lug 13 and one of the links of the chain is seated in the space between the furcations of the lug 14 with the end of the link immediately below the one in the recess engaging the under surface of the lug 14. The chain is then placed in the position in which it is shown in Figure 1 and the spurs are imbedded in the brake lining when one end of the brake shoe is in engagement with the serrations 9 or one of them. When the parts are thus assembled, pressure is exerted on the free end of the brake shoe and it is pivoted on the head of the bracket, resulting in stretching the lining to a proper degree, after which the end of the lining engaged by the spurs is secured in appropriate way. In practice, the brake lining after it is stretched is held in place by pliers or a clamp while fastenings such as rivets, or the like, are being applied to retain the brake lining on the said brake shoe.

In using the invention in association with different braking elements such as A, B, C and D where the brake lining reaches to the end of the element or where other conditions render it inexpedient to pivot the element directly on the support 8, interposed supports or filling blocks such as $a$, $b$, $c$ and $d$ may be employed and these may be of different dimensions to suit particular requirements. The filling blocks may of course be used in other ways than those specifically illustrated but those shown will serve to disclose the diversity of use of which the invention is capable.

From the description and illustration, it will be apparent that the device can be manipulated so as to facilitate the stretching and securing of a brake lining, as compared with devices now in common use or known in the art.

I claim:

In a stretcher for brake shoe lining, a suitably anchored bracket having an approximately horizontally disposed portion with a serrated surface on which an end of a brake shoe may be oscillative, a member having spurs adapted to be imbedded in an end of a lining toward the end of a brake shoe which is oscillatively supported, the said lining being secured to the brake shoe near its opposite end, means for retaining the member in operative relation to the lining, a chain connected to the first mentioned member, an apertured lug on the bracket through which the chain is threaded, and a lug therebelow for engaging the chain and operative to restrain the movement of the first mentioned member.

JOHN B. TRIPP, Jr.